United States Patent
Kim

[11] Patent Number: 6,099,068
[45] Date of Patent: Aug. 8, 2000

[54] ROOF MOLDING DEVICE FOR A VEHICLE

[75] Inventor: Ki Chang Kim, Kyunggi-Do, Rep. of Korea

[73] Assignee: Hyundai Motor Company, Ltd., Seoul, Rep. of Korea

[21] Appl. No.: 08/961,431

[22] Filed: Oct. 30, 1997

[30] Foreign Application Priority Data

Dec. 13, 1996 [KR] Rep. of Korea ............. 96-65470

[51] Int. Cl.$^7$ ............................ B60J 10/08
[52] U.S. Cl. ............. 296/146.9; 296/154; 49/475.1; 49/490.1
[58] Field of Search .............. 296/146.9, 206, 296/154; 49/475.1, 496.1, 484.1, 489.1, 490.1, 498.1

[56] References Cited

U.S. PATENT DOCUMENTS

| | | | |
|---|---|---|---|
| 4,448,430 | 5/1984 | Bright | 49/498.1 X |
| 4,907,838 | 3/1990 | Reaney | 296/146.9 X |
| 4,937,126 | 7/1990 | Jackson | 49/490.1 X |
| 5,127,193 | 7/1992 | Okada et al. | 49/498.1 X |
| 5,352,009 | 10/1994 | Takeuchi | 49/490.1 X |
| 5,423,147 | 6/1995 | Dupuy | 49/496.1 X |
| 5,469,667 | 11/1995 | Le Marrec | 49/498.1 X |
| 5,489,104 | 2/1996 | Wolff | 49/498.1 X |
| 5,511,343 | 4/1996 | Guillon | 49/498.1 X |
| 5,606,828 | 3/1997 | Hall et al. | 49/498.1 X |
| 5,628,150 | 5/1997 | Mesnel | 49/490.1 X |
| 5,679,434 | 10/1997 | Ishibashi et al. | 49/496.1 X |
| 5,755,071 | 5/1998 | Drozd | 49/498.1 X |

FOREIGN PATENT DOCUMENTS 3921381  1/1991  Germany ............. 296/146.9

*Primary Examiner*—D. Glenn Dayoan
*Assistant Examiner*—Patricia Engle

[57] ABSTRACT

A roof molding device for use in a vehicle includes a body side weather strip having a first space and a second space for effectively absorbing impact and inducing adherence to anti-support force generated by the impact when the door of a vehicle closes and opens so as to improve a combined soundproof and adherence ability.

4 Claims, 2 Drawing Sheets

ROOF MOLDING DEVICE FOR A VEHICLE

BACKGROUND OF THE INVENTION

1. Field of the Invention

The present invention relates to a roof molding device for a vehicle and more particularly, to an improved roof molding device for use in a vehicle including a body side weather strip with first and second spaces for absorbing impact and inducing adherence to repulsive support forces generated by operational impact so as to improve a combined soundproof and adherence ability.

2. Description of the Related Art

Various types of roof molding devices for a vehicle are known in the art. FIG. 2 is a sectional view of a connected sealing structure of the roof side portion contacted to an upper portion of a door of a vehicle. The conventional sealing structure includes a roof panel 1, a drip rail 2, and a drip molding 3 for receiving rainwater and disposed at the outside of the roof panel 1, a door frame 4 containing a door side weather strip 6 with an outside lip 5 which is secured to the drip molding 3, and a body side weather strip 7.

However, since such a conventional body side weather strip 7 of the conventional roof molding device has only one space 7a (FIG. 2), such a conventional molding device suffers from a number of problems whereby the combined soundproof and adherence ability decreases and abrasion of adherent portions causes weak adherence and repulsive forces when the door opens and closes.

SUMMARY OF THE INVENTION

Accordingly, it is an object of the present invention to provide an improved roof molding device for use in a vehicle, which eliminates the above problems encountered with conventional roof molding devices.

Another object of the present invention is to provide a roof molding device, which includes a roof panel, a drip rail and a drip molding disposed at the outside of the roof panel for receiving rainwater, a door frame having a door side weather strip and an outside lip secured to the drip molding, and a body side weather strip having a first space and a second space for absorbing operational impact and inducing adherence to anti-support forces generated by the impact so as to improve a combined soundproof and adherence ability.

A further object of the present invention is to provide a roof molding device for a vehicle, which is simple in structure, inexpensive to manufacture, and durable to use.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a roof molding device for use in a vehicle, which includes a body side weather strip having a first space and a second space for effectively absorbing impact and inducing adherence to anti-support forces generated by the impact of opening and closing the door of a vehicle. The present invention improves the soundproof and adherence ability of the weather strip.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
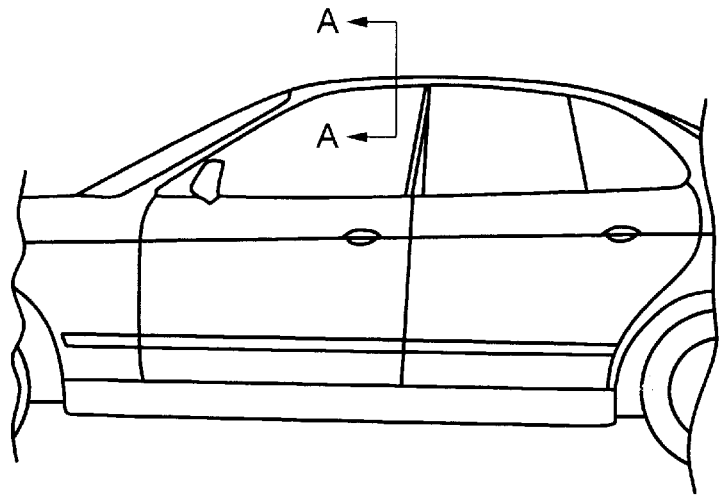
FIG. 1 is a side elevational view of a vehicle.
Figure 2:
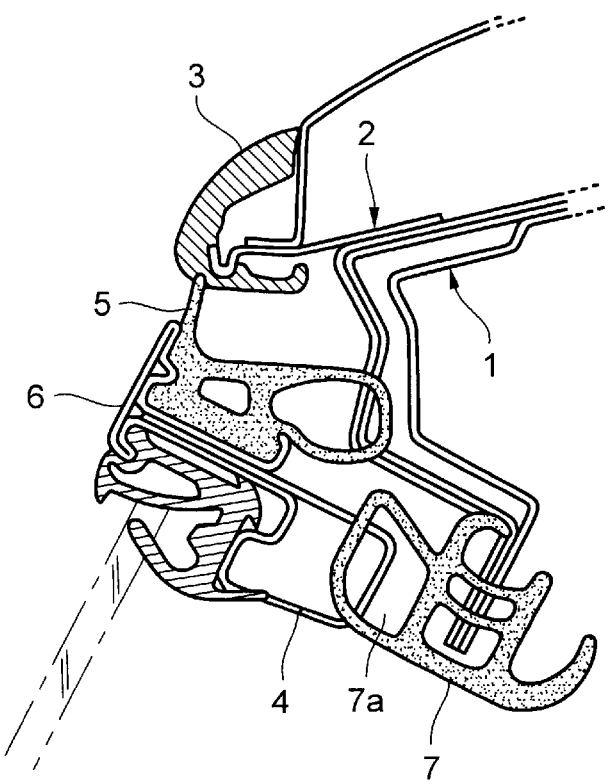
FIG. 2 is a sectional view of FIG. 1 taken along line A—A showing a conventional sealing structure of a roof side portion connected to an upper portion of a door of a vehicle.
Figure 3:
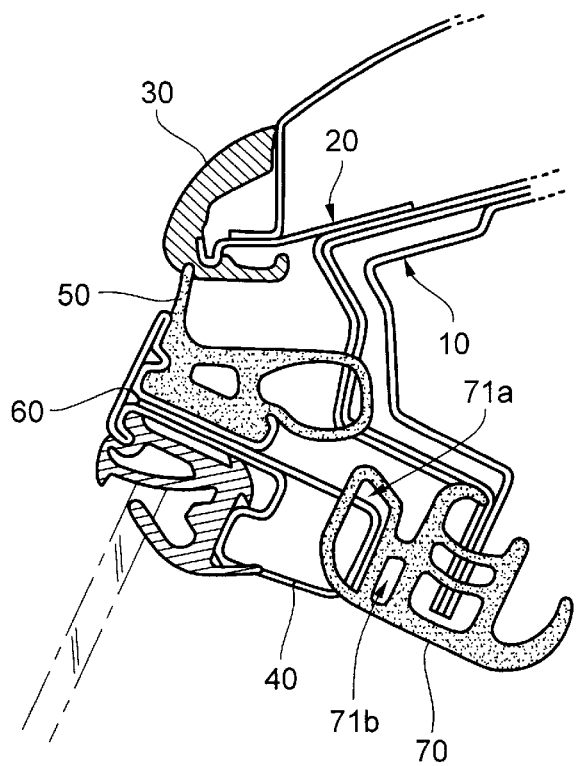
FIG. 3 is a sectional view of a sealing structure of a roof side portion connected to an upper portion of a door of a vehicle showing the roof molding device according to the present invention.

Referring now in detail to the drawings for the purpose of illustrating preferred embodiments of the present invention, the roof molding device for a vehicle, as shown in FIG. 3, comprises a roof panel 10, a drip rail 20, a drip molding 30 disposed at the outside of the roof panel for receiving rainwater, a door frame 40 containing a door side weather strip 60 fixed thereto, and a body side weather strip 70. The door side weather strip 60 has an outside lip 50 and is mounted to the drip molding 30.

The body side weather strip 70 includes a first space 71a and a second space 71b. The first space 71a is larger than the second space 71b, and the first and second spaces 71a and 71b are disposed to contact portions between the body side weather strip 70 and the door frame 40. The first space 71a is designed to absorb impact and the second space 71b induces adherence to a repulsive support force generated by operational impact, so that the roof molding device improves the adherence with and repulsive force from an adherent portion of the door frame 40. Accordingly, the roof molding device, according to the present invention, improves the soundproof and adherence abilities and prevents abrasion and damage at the contacting portion of the door frame 40.

Figure 4A:
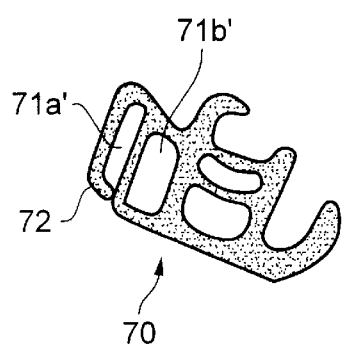
FIG. 4(A) is a sectional view of a second embodiment of a body side weather strip of the roof molding device according to the present invention.

FIG. 4(A) is a sectional view of a second embodiment of the body side weather strip 70, which includes a first space 71a' and a second space 71b' formed by an upper rib 72 for framing an "α" shape configuration. The end of the upper rib 72 is slidably engaged with the body side weather strip 70 for increasing the impact absorption and repulsive support force when the body side weather strip 70 adheres to the door frame 40.

Figure 4B:
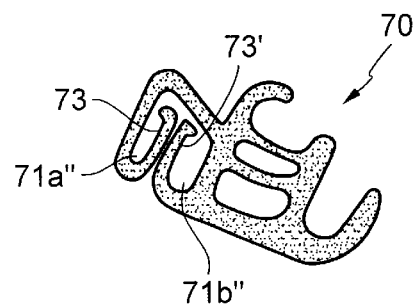
FIG. 4(B) is a sectional view of a third embodiment of a body side weather strip of the roof molding device according to the present invention.

FIG. 4(B) is a sectional view of the third embodiment of the body side weather strip 70, which includes a first space 71a" and a second space 71b" formed by a symmetrical and inwardly bending pair of inward ribs 73 and 73' for absorbing more impact when the body side weather strip 70 adheres to the door frame 40.

Figure 4C:
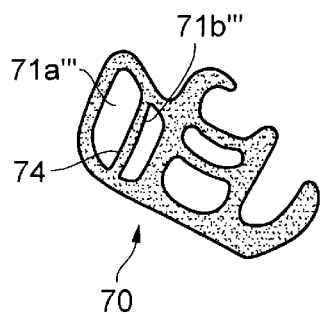
FIG. 4(C) is a sectional view of a fourth embodiment of a body side weather strip of the roof molding device according to the present invention.

FIG. 4(C) is a sectional view of a fourth embodiment of the body side weather strip 70, which includes a first space 71a'" and a second space 71b'" created by providing a partition 74 between both spaces 71a'" and 71b'" for increasing the adherent force and the repulsive force when the body side weather strip 70 adheres to the door frame 40.

The invention being thus described, it will be obvious that the same may be varied in many ways. Such variations are not to be regarding as a departure from the spirit and scope of the invention, and all such modifications as would be obvious to one skilled in the art are intended to be included in the scope of the following claims.

What is claimed is:

1. A roof molding device for use in a vehicle, comprising:

a roof panel;

a drip rail and a drip molding extending from and disposed at the outside of said roof panel for receiving rainwater;

a door frame including a door side weather strip, said door side weather strip containing an outside lip securable to a side of the drip molding; and a body side weather strip connected to said roof panel, said body side weather strip including a first space for absorbing operational impact, and a second space for inducing adherence and repulsive support force to the door frame responsive to the operational impact, whereby the roof molding device exhibits improved soundproof and adherence force properties when the body side weather strip is adhered to the door frame, the first and second spaces are defined by walls, at least one of the walls defining the first and second spaces slidably engaging other of the walls, whereby sizes of the first and second spaces are changeable for increasing impact absorption and repulsive support force, wherein the walls comprise internal ribs that define the first and second spaces, the internal ribs slidably engaging each other, thereby permitting the first and second spaces to contract for increasing impact absorption.

2. The roof molding device of claim 1, wherein the first space is larger than the second space.

3. The roof molding device of claim 1, wherein the first and second spaces are partly contiguous with each other.

4. A body side weather strip adapted to be connected to a door frame of a vehicle, the body side weather strip comprising:

a first space for absorbing operational impact; and a second space for inducing adherence and repulsive support force to the door frame responsive to the operational impact, whereby the body side weather strip exhibits improved soundproof and adherence force properties when the body side weather strip is adhered to the door frame, the first and second spaces are defined by walls, at least one of the walls defining the first and second spaces slidably engaging other of the walls, whereby sizes of the first and second spaces are changeable for increasing impact absorption and repulsive support force, wherein the walls comprise internal ribs that define the first and second spaces, the internal ribs slidably engaging each other, thereby permitting the first and second spaces to contract for increasing impact absorption.

* * * * *